(12) United States Patent
Nakano et al.

(10) Patent No.: US 9,483,813 B2
(45) Date of Patent: Nov. 1, 2016

(54) IMAGE PROCESSING APPARATUS, COMPUTER-READABLE MEDIUM STORING AN IMAGE PROCESSING PROGRAM, AND IMAGE PROCESSING METHOD

(71) Applicant: NK Works Co., Ltd., Wakayama-shi, Wakayama (JP)

(72) Inventors: Tomoo Nakano, Wakayama (JP); Koji Kita, Wakayama (JP)

(73) Assignee: NORITSU PRECISION CO., LTD., Wakayama-shi (JP)

( * ) Notice: Subject to any disclaimer, the term of this patent is extended or adjusted under 35 U.S.C. 154(b) by 382 days.

(21) Appl. No.: 14/173,514

(22) Filed: Feb. 5, 2014

(65) Prior Publication Data
US 2014/0223368 A1    Aug. 7, 2014

(30) Foreign Application Priority Data
Feb. 5, 2013 (JP) .................. 2013-020838

(51) Int. Cl.
G06K 9/40 (2006.01)
G06T 5/00 (2006.01)
G06F 3/0484 (2013.01)

(52) U.S. Cl.
CPC ........... *G06T 5/003* (2013.01); *G06F 3/04845* (2013.01); *G06F 3/04847* (2013.01)

(58) Field of Classification Search
USPC .............. 382/254, 255, 270, 175; 250/492.2, 250/492.22; 324/309; 359/23; 345/427, 345/475; 600/410, 419; 715/810
See application file for complete search history.

(56) References Cited

U.S. PATENT DOCUMENTS

| | | | | |
|---|---|---|---|---|
| 5,877,629 A | * | 3/1999 | King | G01R 33/4824 324/309 |
| 6,104,035 A | * | 8/2000 | Muraki | B82Y 10/00 250/492.2 |
| 6,618,051 B1 | * | 9/2003 | Edwards | G03H 1/00 345/427 |
| 7,496,287 B2 | | 2/2009 | Sasaki et al. | |

FOREIGN PATENT DOCUMENTS

JP    2006-180429 A    7/2006
JP    2007-295427 A    11/2007

* cited by examiner

*Primary Examiner* — Anh Do
(74) *Attorney, Agent, or Firm* — Westerman, Hattori, Daniels & Adrian, LLP

(57) ABSTRACT

An image processing apparatus that can be connected to a display device and removes blurring from a first-order image is provided. The image processing apparatus includes a generation unit, a display control unit, and a selection reception unit. The generation unit generates multiple I-th order intermediate images by performing blur correction in multiple blur directions on an I-th order image. The display control unit causes the multiple I-th order intermediate images to be displayed on the display device. The selection reception unit allows the user to select an (I+1)-th order image from among the displayed multiple I-th order intermediate images as a corrected image whose blurring has been reduced more than in the I-th order image. The generation unit, the display control unit, and the selection reception unit execute the above processing in order with respect to I=1, 2, . . . , K (K being a natural number).

20 Claims, 8 Drawing Sheets

IMAGE PROCESSING APPARATUS, COMPUTER-READABLE MEDIUM STORING AN IMAGE PROCESSING PROGRAM, AND IMAGE PROCESSING METHOD

FIELD OF INVENTION

The present invention relates to an image processing apparatus, a computer-readable medium storing an image processing program and an image processing method.

BACKGROUND

Blurring can appear in an image when a subject moves or the photographer causes camera-shake at the time of image capture, and a method of using a Wiener filter, an RL method, and the like are publicly known as algorithms for removing this kind of blurring. Also, "blur direction", which is the direction in which the subject moves, the direction of camera-shake, or the like is often a parameter in blur correction for removing this kind of blurring (see Patent Literature 1: JP 2007-295427A and 2: JP 2006-180429A). The blur direction parameter can be estimated based on a detected value of a camera-shake correction mechanism such as a gyro sensor that is mounted in the camera (e.g., Patent Literature 1), but even without that information, it is possible to estimate the blur direction parameter based on the image in which blurring appears. For example, in Patent Literature 2, the blur direction of the subject is estimated based on the movement of feature points in two images captured in succession.

As mentioned above, beginning with Patent Literature 2, various algorithms for estimating blur direction based on the blurred image itself have been proposed in the prior technology, but these algorithms are effective only under specific conditions (e.g., when the blurring is linear, or when the blurring occurs at a fixed speed). Accordingly, an algorithm that is effective under specific conditions is not effective for all images, and it is difficult to obtain an image from which blurring has been removed to the user's satisfaction.

SUMMARY of INVENTION

An object of the present invention is to provide an image processing apparatus that can accurately remove blurring by the user determining the blur direction while visually checking the effect of blur correction, a computer-readable medium, and an image processing method.

An image processing apparatus according to a first aspect is an image processing apparatus that can be connected to a display device and removes blurring from a first-order image, and includes a generation unit, a display control unit, and a selection reception unit. The generation unit generates multiple I-th order intermediate images by performing blur correction in multiple blur directions on an I-th order image. The display control unit causes the multiple I-th order intermediate images to be displayed on the display device. The selection reception unit allows the user to select an (I+1)-th order image from among the displayed multiple I-th order intermediate images as a corrected image whose blurring has been reduced more than in the I-th order image. The generation unit, the display control unit, and the selection reception unit execute the above processing in that order with respect to I=1, 2, . . . , K (K being a natural number). Note that if K=1, the above processing is performed once, and if K≥2, it is performed K times.

Here, the I-th order image undergoes blur correction in multiple blur directions, and as a result, multiple I-th order intermediate images that respectively correspond to the blur directions are generated. These I-th order intermediate images are displayed to the user, and based on them, from among the multiple provided I-th order intermediate images, the user selects a corrected image whose blurring has been reduced in comparison to the I-th order image, and the selected image is used as the (I+1)-th order image. In other words, the I-th order intermediate images are candidate images for selecting a corrected image. Note that if K≥2, the above series of processes is repeated multiple times (K times). It is possible to allow the user to determine the number of repetitions K (including the case where K=1) as appropriate (including the case where it is possible for the user to end the processing at his/her preferred timing while viewing the corrected image and/or the candidate images, or the like), and it is possible for it to be set in advance. Also, blur correction in a certain blur direction is processing for correcting the blurring under the assumption that the blurring has occurred in that blur direction.

According to the above processing, rather than first determining the blur direction and then executing blur correction in that blur direction, blur correction is executed in multiple candidate blur directions before the blur direction is determined. Then, while visually checking the effect of the blur correction, the user selects the correct corrected image, or in other words, the correct blur direction from among the multiple candidate images, or in other words, the multiple candidate blur directions that are obtained as a result. Accordingly, here, blurring can be accurately removed by the user determining the blur direction while visually checking the effect of the blur correction.

An image processing apparatus according to a second aspect is the image processing apparatus according to the first aspect, where K is a natural number that is greater than or equal to two.

In other words, here, the three above-described steps (the above-described operations performed by the generation unit, the display control unit, and the selection reception unit) are repeated multiple times (K times). In other words, the blur direction of the first-order image is determined, a second-order image is obtained by performing blur correction in the blur direction on the first-order image, and subsequently, the blur direction of the second-order image is furthermore determined, a third-order image is obtained by performing blur correction in that blur direction on the second-order image, and thereafter the above series of processing is repeated as appropriate. Accordingly, the user successively selects the direction that he or she thinks is correct as the blur direction. As a result, here, it is possible to obtain a corrected image in which not only blurring that occurs in a straight linear path has been removed, but also complex blurring that occurs in a bent path has been removed.

An image processing apparatus according to a third aspect is the image processing apparatus according to the first aspect or the second aspect, furthermore including a storage unit. The storage unit stores the (K+1)-th order image as the final corrected image obtained by removing blurring from the first-order image.

Here, the (K+1)-th order image, or in other words, the corrected image that was most recently selected (or the selected image if only one selection has been made) is stored as the corrected image obtained by finally removing blurring from the initial image (the first-order image). Accordingly, the final corrected image can be used.

An image processing apparatus according to a fourth aspect is the image processing apparatus according to the second aspect, furthermore including a storage unit. The storage unit does not store second-order to K-th order images and stores a (K+1)-th order image as a final corrected image obtained by removing blurring from the first-order image.

Here, instead of the second-order to K-th order images being stored, only the (K+1)-th order image, or in other words, the corrected image that was most recently selected (or the selected image if one selection has been made) is stored as the corrected image obtained by finally removing blurring from the initial image (the first-order image). Accordingly, by not storing images that are not useful (the second-order to K-th order images that are intermediate generated objects), it is possible to use a useful image (the final corrected image) while conserving space in the storage medium.

An image processing apparatus according to a fifth aspect is the image processing apparatus according to any one of the first to fourth aspects, where the display control unit causes the I-th order intermediate images to be displayed on the display device using a mode of arranging the I-th order intermediate images in directions corresponding to the respective blur directions using the I-th order image as a reference.

Here, the I-th order intermediate images are displayed in positions corresponding to the blur directions using the I-th order image as a reference so as to allow the user to select the (I+1)-th order image that is to be the corrected image for the I-th order image from among the I-th order intermediate images. For example, assuming that the I-th order image is an image in which the (I+1)-th order image is blurred in the direction of 30° to the upper right, the (I+1)-th order image is displayed in a position that is 30° to the lower left of the I-th order image. Accordingly, the user can intuitively understand the direction of blurring while selecting a specific corrected image from among multiple candidate images.

An image processing apparatus according to a sixth aspect is the image processing apparatus according to the second aspect, where the display control unit causes the blur direction from the first-order image to the (I+1)-th order image to be displayed as a line diagram, in order with respect to I=1, 2, . . . , K.

Here, multiple candidate images are displayed, and every time the user selects a specific corrected image, or in other words, every time the user selects a specific blur direction, the blur direction from the initial image (first-order image) to the most recent corrected image is displayed as a line diagram. Accordingly, while successively selecting the blur directions, the user can intuitively understand the blur direction from the initial image (first-order image) to the most recent corrected image.

An image processing apparatus according to a seventh aspect is the image processing apparatus according to any one of the first to sixth aspects, where the display control unit allows the user to select a blur amount that is to be a blur correction parameter.

In addition to the blur direction, the "blur amount" in the blur direction is often used as a parameter in blur correction. Thus, the blur amount parameter is selected by the user here. Accordingly, the user can obtain an image from which blurring has been removed to his or her satisfaction.

A non-transitory computer-readable medium according to an eighth aspect stores an image processing program. The image processing program is an image processing program that is for removing blurring from a first-order image and causes a computer to execute the following three steps in order, with respect to I=1, 2, . . . , and K (K being a natural number). The first step is a step of generating multiple I-th order intermediate images by performing blur correction in multiple blur directions on an I-th order image. The second step is a step of displaying the I-th order intermediate images. The third step is a step of allowing the user to select an (I+1)-th order image from among the display I-th order intermediate images as a corrected image in which blurring has been reduced to a greater degree than in the I-th order image. Note that the above three steps are executed once if K=1, and K times if K≥2. Here, an effect similar to that of the first aspect can be demonstrated.

An image processing method according to a ninth aspect is an image processing method for removing blurring from a first-order image, and includes the following three steps, which are to be executed in order with respect to I=1, 2, . . . , and K (K being a natural number). The first step is a step of generating multiple I-th order intermediate images by performing blur correction in multiple blur directions on an I-th order image. The second step is a step of displaying the I-th order intermediate images. The third step is a step of allowing the user to, from among the displayed I-th order intermediate images, select an (I+1)-th order image as a corrected image in which blurring has been reduced to a greater degree than in the I-th order image. Note that the above three steps are executed once if K=1, and K times if K≥2. Here, an effect similar to that of the first aspect can be demonstrated.

According to the present invention, rather than first determining the blur direction and then executing blur correction in that blur direction, blur correction is performed in multiple candidate blur directions before the blur direction is determined. Then, while visually checking the effect of the blur correction, the user selects the correct corrected image, or in other words, the correct blur direction from among the multiple candidate images, or in other words, the multiple candidate blur directions that are obtained as a result. Accordingly, here, blurring can be accurately removed by the user determining the blur direction while visually checking the effect of the blur correction.

DETAILED DESCRIPTION OF THE PREFERRED EMBODIMENTS

Hereinafter, an image processing apparatus, a computer-readable medium storing an image processing program and an image processing method according to an embodiment of the present invention will be described with reference to the drawings.

1. Overview of Image Processing Apparatus

Figure 1:
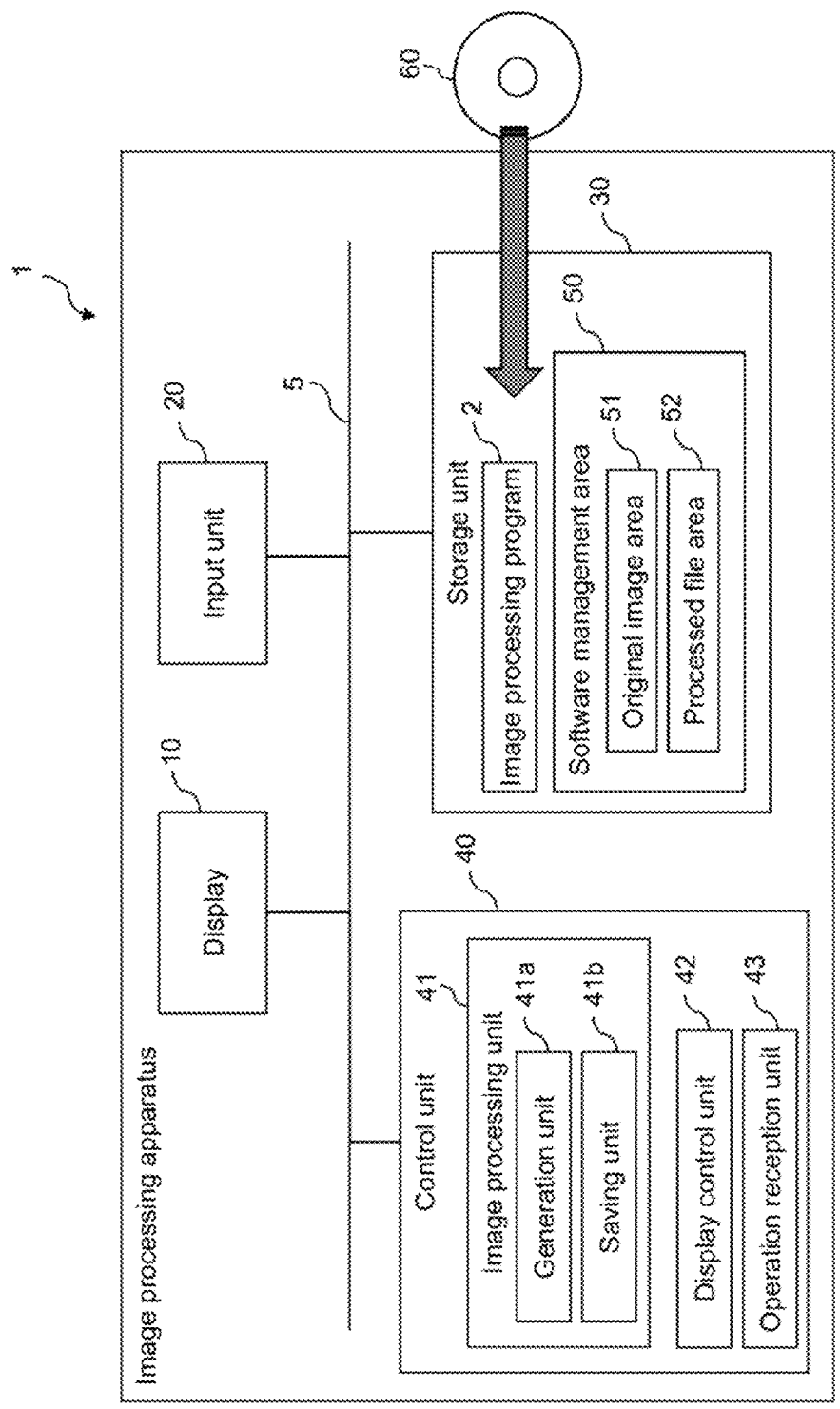
FIG. 1 is a block diagram of an image processing apparatus according to an embodiment of the present invention.

An image processing apparatus 1 shown in FIG. 1 is one embodiment of an image processing apparatus according to the present invention. The image processing apparatus 1 is a general-purpose personal computer. An image processing program 2 that is one embodiment of an image processing program according to the present invention is provided and installed in the image processing apparatus 1 via, for example, a computer-readable recording medium 60 such as a CD-ROM, a DVD-ROM and an USB memory that stores the image processing program 2. The image processing program 2 is application software for supporting image processing performed on moving images and still images. The image processing program 2 causes the image processing apparatus 1 to execute steps included in operations that will be described later.

The image processing apparatus 1 has a display 10, an input unit 20, a storage unit 30, and a control unit 40. The display 10, the input unit 20, the storage unit 30, and the control unit 40 can appropriately communicate with each other due to being connected to each other via a bus line or cable 5, for example. In the present embodiment, the display 10 is configured by a liquid crystal display or the like and displays later-described screens and the like to a user. The input unit 20 is configured by a mouse and a keyboard, or the like and receives operations performed by the user on the image processing apparatus 1. The storage unit 30 is a non-volatile storage area configured by hard disk or the like. The control unit 40 is configured by a CPU, a ROM and a RAM, or the like.

The image processing program 2 is stored in the storage unit 30. A software management area 50 is secured in the storage unit 30. The software management area 50 is an area used by the image processing program 2. An original image area 51 and a processed file area 52 are secured in the software management area 50. The roles of these areas 51 and 52 will be described later.

The control unit 40 operates in a virtual manner as an image processing unit 41, a display control unit 42, and an operation reception unit 43, by reading out and executing the image processing program 2 stored in the storage unit 30. More specifically, the image processing unit 41 operates as a generation unit 41a and a saving unit 41b, when the image processing of blur correction (described later) is performed. The operations of the units 41 to 43, 41a and 41b will be described later.

Figure 2:
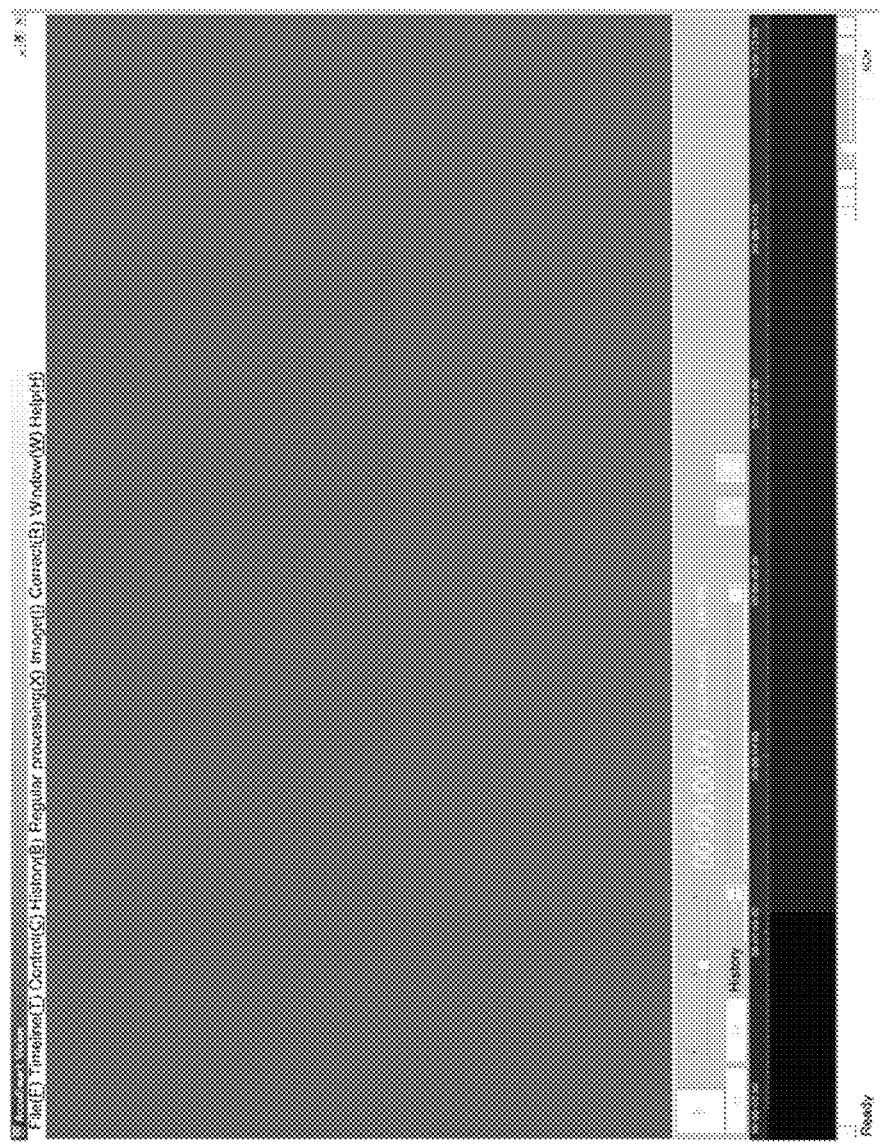
FIG. 2 is a diagram showing a basic screen before image data is received.

2. Detailed Description of Configuration and Operations of Image Processing Apparatus The control unit 40 starts the image processing program 2 upon detecting that the user has performed a predetermined operation via the input unit 20. When the image processing program 2 has been started, a basic screen W1 (see FIG. 2) is displayed on the display 10. Note that the display control unit 42 controls the display of screens, windows, buttons and all other elements that are displayed on the display 10 in association with operations by the image processing program 2. With respect to operations by the image processing program 2, the operation reception unit 43 receives instructions, selections, settings and all other information that are inputted by the user's operation via the input unit 20 to the elements such as the screens, windows and buttons displayed on the display 10.

2-1. Import of Image Data

The basic screen W1 receives an instruction to import image data to the original image area 51 from a user. Image data imported to the original image area 51 is targeted for later-described playback processing and image processing. The control unit 40 imports image data to the original image area 51 from a still image file or a moving image file. Note that in this specification, still image files are data files in a still image format, and moving image files are data files in a moving image format.

In the case of importing image data from a still image file, the user designates one still image file or one folder by operating the input unit 20. In the case of the former, the control unit 40 prompts the user to input a filename and an address path in the storage unit 30 for that still image file. In the case of the latter, the control unit 40 prompts the user to input a folder name and an address path in the storage unit 30 for that folder. Thereafter, the control unit 40 saves the designated still image file or all the still image files in the designated folder as a group of still image files in the original image area 51. Note that the term "group" used in this specification is not limited to being made up of multiple elements, and may be made up of one element.

On the other hand, in the case of importing image data from a moving image file, the user inputs a filename and an address path in the storage unit 30 for one moving image file by operating the input unit 20. The display control unit 42 displays a moving image import window (not shown) in a superimposed manner on the basic screen W1 upon detecting that the user designated a moving image file. The moving image import window receives the selection of a segment of arbitrary length from the user, out of the entire segment of the timeline of the designated moving image file. Upon detecting that the user selected a specific segment via the input unit 20, the control unit 40 generates a group of still image files that corresponds on a one-to-one basis to the group of frames included in that segment of the designated moving image file. Thereafter, the control unit 40 saves this group of still image files in the original image area 51. Accordingly, in the present embodiment, the image data targeted for later-described playback processing and image processing is not a moving image file, but rather still image files.

Note that even if a group of still image files imported to the original image area 51 originates from still image files rather than from a moving image file, the control unit 40 recognizes the still image files included in the group as being still image files that are arranged in a timeline. The arrangement is automatically determined based on file attributes (filename, created on date/time, updated on date/time, or the like).

2-2. Playback Processing with Respect to a Group of Still Image Files

When a group of still image files is imported to the original image area 51, the display control unit 42 displays a display window W2 (see FIG. 3) in a superimposed manner on the basic screen W1. The number of display windows W2 that are created is the same as the number of timelines of the groups of still image files that were imported to the original image area 51.

First, one still image file included in the group of still image files imported to the original image area 51 (e.g., the still image file corresponding to the first frame on the timeline) is displayed in the display window W2. Thereafter, the frame that is displayed in the display window W2 is switched based upon a user operation, as will be described later.

Figure 3:
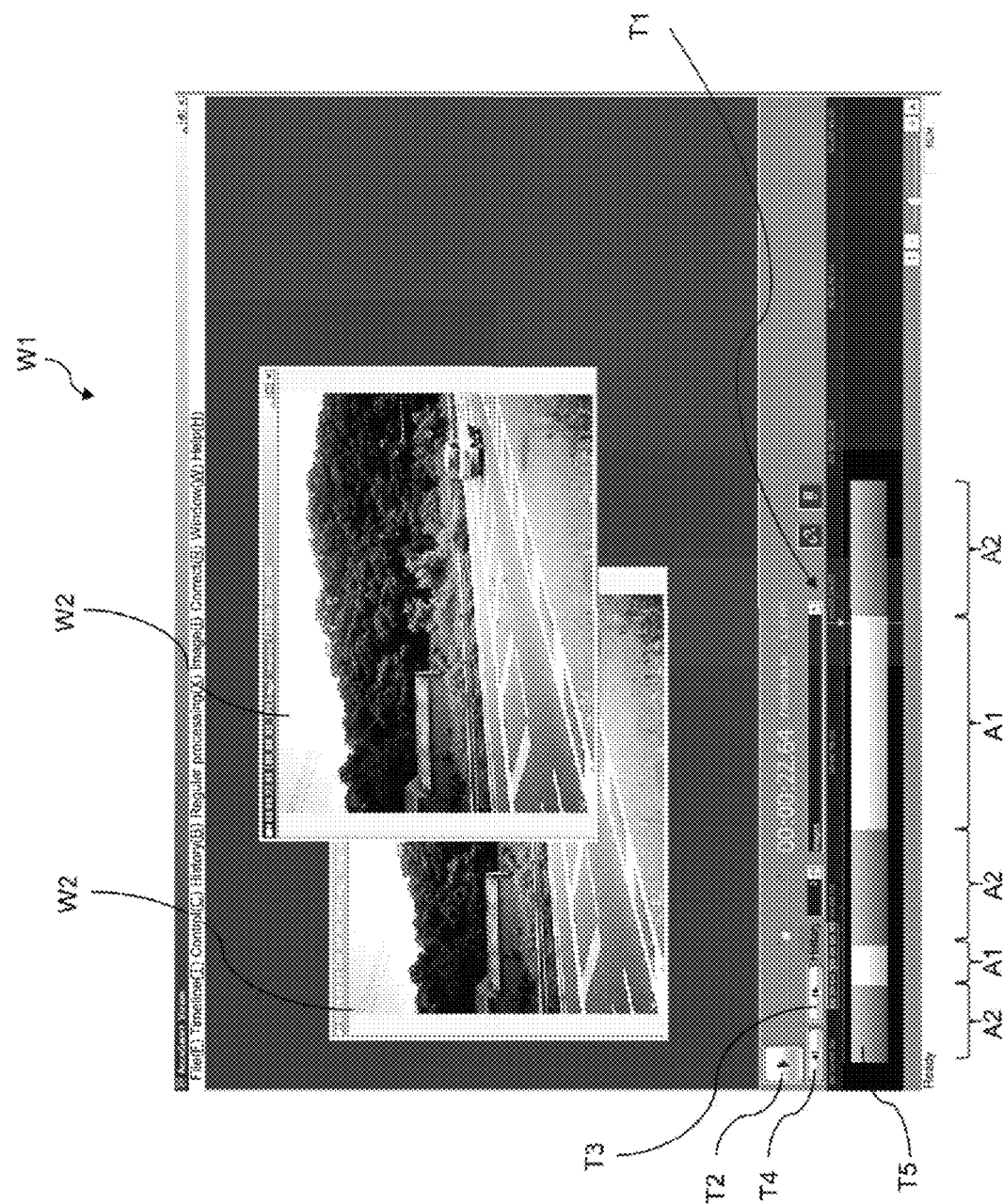
FIG. 3 is a diagram showing a basic screen after image data is received.

The group of frames that belong to the timeline corresponding to the display window W2 can be played back as a moving image in that display window W2 by the display control unit 42. Here, as shown in FIG. 3, a window selection pull-down menu T1, a play button T2, a frame advance button T3, a frame reverse button T4, and a timeline bar T5 are arranged on the basic screen W1.

Even if there are multiple display windows W2, there is only one active display window W2. The window selection pull-down menu T1 receives a user selection of which display window W2 is to be made active. Hereinafter, the timeline that corresponds to the active display window W2 is referred to as the active timeline, and frame group that belongs to the active timeline is referred to as the active frame group. Also, the frame currently displayed in the active display window W2 is referred to as the active display frame.

The play button T2 receives a user instruction to play back the active frame group as a moving image. Upon detecting that the user has pressed the play button T2 via the input unit 20, the display control unit 42 displays the frames included in the active frame group sequentially along the timeline in the active display window W2 in a frame advance format. Note that playback starts from the active display frame at the point in time when the play button T2 is pressed. Also, the play button T2 receives a user instruction to stop playback. Upon detecting that the user has pressed the play button T2 via the input unit 20 during playback, the display control unit 42 fixes the display in the active display window W2 to the active display frame at that point in time.

The frame advance button T3 and the frame reverse button T4 respectively receive user instructions to switch the active display frame to the next frame and the previous frame along the active timeline.

The timeline bar T5 is an object that diagrammatically represents the active timeline. The timeline bar T5 is equally divided in the direction in which the bar extends, the number of the divided areas being the same as the number of frames included in the active frame group. An n-th divided area from the left on the timeline bar T5 corresponds to the n-th frame on the active timeline (where n is a natural number).

As shown in FIG. 3, divided areas A1 corresponding to a selected frame group and divided areas A2 corresponding to a non-selected frame group are displayed in a different manner in the timeline bar T5. The selected frame group is the frame group that corresponds to the segment that is currently selected on the active timeline. The non-selected frame group is the frame group that corresponds to the segment that is not currently selected on the active timeline.

The timeline bar T5 receives a user selection of an arbitrary segment on the active timeline. In other words, by operating divided areas on the timeline bar T5 via the input unit 20, the user can select an arbitrary number of frames in the active frame group. The image processing unit 41 recognizes the selected frame group as being the target of later-described image processing. Note that each time a divided area on the timeline bar T5 is selected by the user, the active display frame is switched to the frame that corresponds to the most recently selected partitioned area.

2-3. Image Processing

Hereinafter, image processing with respect to a selected frame group will be described. The image processing unit 41 can execute multiple image processing modules such as noise removal, sharpness, brightness/contrast/chroma adjustment, image resolution adjustment, rotation, and the addition of characters/arrows/mosaic, and blur correction. The image processing modules are incorporated in the image processing program 2.

By operating the basic screen W1 via the input unit 20, the user can select any of the image processing modules any number of times in any order. Each time the image processing unit 41 detects that the user selected an image processing module, it executes that image processing module on the selected frame group. Note that the execution of an image processing module on a selected frame group refers to the execution of that image processing module on each frame included in that selected frame group.

As image processing modules are executed on a frame sequentially, that is, once, twice, thrice, and so on, that frame is sequentially manipulated into a first-order frame, a second-order frame, a third-order frame, and so on. A 0th-order frame corresponds to a still image file saved in the original image area 51. An (m+1)th-order frame corresponds to a still image file obtained after an image processing module has been executed once on a still image file corresponding to an m-th-order frame (where m is an integer greater than or equal to 0). The image processing unit 41 sequentially generates still image files that correspond to the first-order and subsequent frames, and saves those still image files individually in the processed file area 52.

Figure 4:
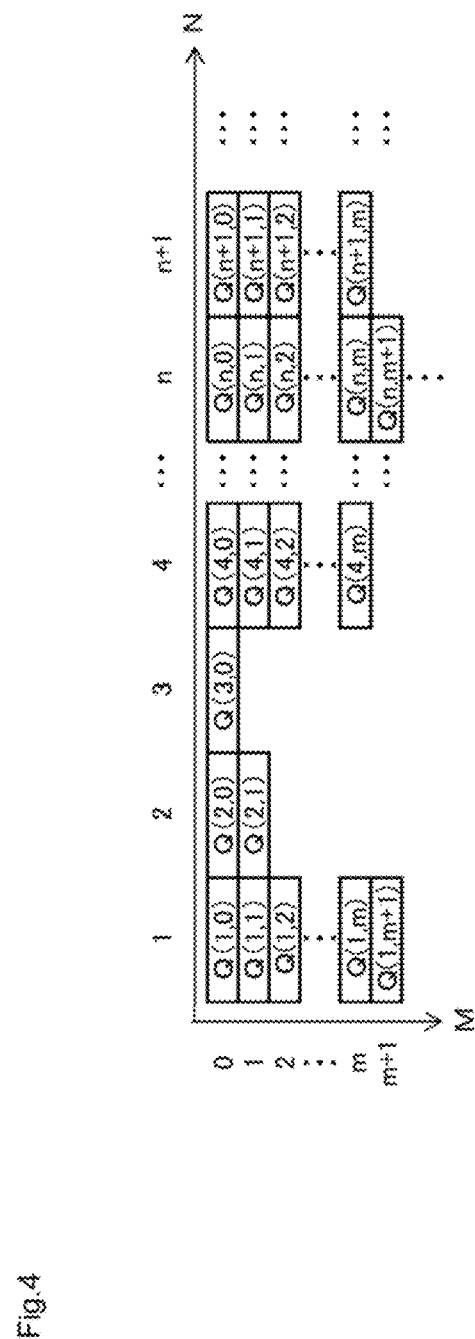
FIG. 4 is a diagram showing a group of still images belonging to one timeline.

FIG. 4 is a conceptual diagram showing how a group of still images belonging to one timeline is managed by the image processing program 2. In FIG. 4, an N axis, which is the horizontal axis, represents the order of the frames on the timeline, and an M axis, which is the vertical axis, represents the order of processing. The box corresponding to the coordinates (n,m) in an N-M space in FIG. 4 represents the still image Q(n,m). The still image Q(n,m) is the m-order still image of the n-th frame on the timeline (where n is a natural number, and m is an integer greater than or equal to 0).

For each frame, the control unit 40 manages the value of the currently selected coordinate m as a parameter $m_s$. Immediately after a group of still image files has been imported to the original image area 51, the coordinate $m_s$ takes an initial value 0. Thereafter, every time the image processing module is executed, the coordinate $m_s$ of the frame is incremented by 1. Also, the user is able to freely change the coordinate $m_s$ of the selected frame group by performing a predetermined operation via the input unit 20. Note that executing an image processing module on a frame refers to executing the image processing module on an $m_s$-order still image of the frame. Accordingly, changing the coordinate $m_s$ effectively means changing the execution target of the image processing module. Incidentally, displaying a frame refers to displaying a still image of the coordinate $m_s$ of the frame. Accordingly, changing the coordinate $m_s$ also effectively means changing the target to be displayed on the active display window W2.

2-3-1. Blur Correction

A flow of blur correction image processing (referred to as blur correction processing below), which is one type of image processing implemented by the image processing program 2, will be described below. In general, blurring can occur in an image when the subject moves or the photographer causes camera-shake at the time of image capture, and blur correction processing is processing for removing this kind of blurring. Note that "blurring" is used here as an expression for the sake of simplicity, but the present invention applies not only to a reduction in blurring, but also to an improvement in focus. Blur correction processing is realized by a blur correction image processing module, and is a processing in which a blur correction routine that is incorporated therein is executed one or multiple times.

Figure 5:
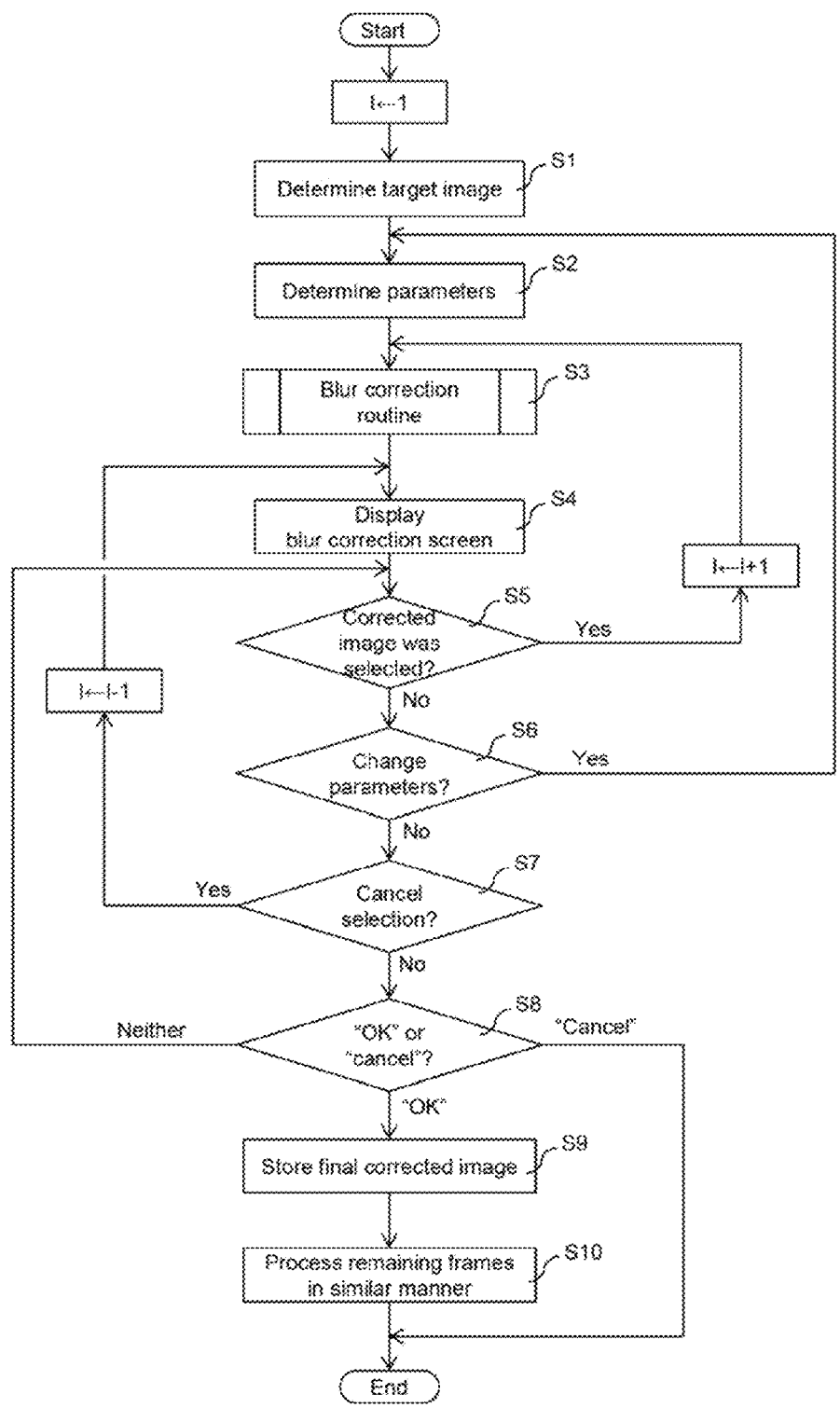
FIG. 5 is a flowchart showing a flow of blur correction processing.

FIG. 5 is a flowchart showing a flow of blur correction processing. This processing starts when the user performs a predetermined operation on the basic screen W1 via the input unit 20.

As described above, blur correction processing is executed on a selected frame group, but in step S1, the image processing unit 41 selects one frame out of the selected frame group as the target of the blur correction routine that will be executed subsequently in step S3. Note that the selection rule here can be set as necessary, and for example, it may be set such that if only one frame is included in the selected frame group, that frame is selected, and if multiple frames are included, the frame that was selected most recently is selected. Also, the target of the blur correction routine in step S3 is, more accurately, the $m_s$-th order still image of the frame that was selected according to this rule. Note that the image that is to be the target of the blur correction routine in step S3 will be referred to as the "target image" below. When step S1 ends, the procedure moves to the processing of step S2.

In step S2, the image processing unit 41 determines the parameters of the blur correction routine that are to be used in step S3. The types of parameters determined here include the correction method, noise coefficient, calculation repetition limit, standard deviation σ, and blur amount w. The correction method is the algorithm for the blur correction routine, and in the present embodiment, it is selected from two types, namely a method that uses a Wiener filter, and an RL method. Also, the noise coefficient is a parameter that is to be designated in the case where the method using a Wiener filter is selected as the correction method, and it is a coefficient for evaluating noise that is included in the target image. The calculation repetition limit is a parameter that is to be designated in the case where the RL method is selected as the correction method, and it is a coefficient that defines the upper limit on the number of times a predetermined calculation is repeated. Also, the standard deviation σ and the blur amount w are factors for determining a point spread function indicating the extent of defocus and the extent of blurring in the target image. Accordingly, determining of parameters of the standard deviation σ and the blur amount w in step S2 means to determine the point spread function of the target image that is to be used in step S3. The standard deviation σ is a parameter for defining the extent of defocus in the target image, and the blur amount w is a parameter for defining the extent of blurring in the target image.

As can be understood from FIG. 5, step S2 can be executed multiple times depending on the selection by the user. Here, in the first time step S2, pre-defined initial values are given as the values for the correction method, the noise coefficient, the calculation repetition limit, the standard deviation σ, and the blur amount w. On the other hand, if the procedure moves from the later-described step S6 to step S2 due to the user changing any of these parameters via a later-described blur correction screen W3, the changed parameter is updated to a value that corresponds to the user operation. When step S2 ends, the procedure moves to the processing of step S3.

As shown in FIG. 5, step S3 can be executed multiple times depending on the selection by the user. Here, an iteration number I is set to an initial value of 1 immediately before step S1. In the I-th iteration of step S3, the generation unit 41a executes the blur correction routine on the target image using the parameters determined in the most recently executed step S2. This results in the generation of multiple intermediate images $f_I(x,y)$, which are images obtained by performing blur correction on a reference image $g_I$ in multiple blur directions θ. Here, when I=1, the reference image $g_I$ is the target image, and when I≥2, the reference image is the most recent corrected image. The corrected image will be described later. Also, the multiple blur directions θ in the present embodiment are eight directions at equal intervals in the circumferential direction, that is to say θ=0°, 45°, 90°, 135°, 180°, 225°, 270°, 315°.

Specifically, in the I-th iteration of step S3, the generation unit 41a derives point spread functions $H_I(x,y)$ of the target image using the standard deviation σ and the blur amount w that were determined in the most recent step S2. x,y is an orthogonal coordinate system that represents a spatial region for specifying pixels in the target image. Here, eight point spread functions $H_I(x,y)$ are derived using the procedure below for the above-described eight blur directions θ.

First, the generation unit 41a derives eight functions $h_I(x,y)$ that respectively correspond to the above-described eight blur directions θ and show the extent of blurring in the target image. Specifically, the functions $h_I(x,y)$ are functions obtained by changing the values corresponding to points on a straight line that connects the point $P_{I-1}(x,y)$ and the point $P_I(x,y)$ in the xy plane in the function $h_{I-1}(x,y)$ to 255. Note that if I≥2, the function $h_{I-1}(x,y)$ here is, out of the eight functions $h_{I-1}(x,y)$ that were derived in the previous iteration I−1 of step S3 (if the previous iteration I−1 of step S3 has been executed multiple times, the most recent one is used), the one that corresponds to the blur direction θ that was selected by the user via the later-described blur correction screen W3. On the other hand, when I=1, the function $h_{I-1}(x,y)=h_0$ is a function in which 255 is used as the value corresponding to points on a straight line connecting the origin $P_0(0,0)$ and the point $P_1(x,y)$ in the xy plane, and 0 is used as the value corresponding to all other points.

Also, $P_I(x,y)$ above is a point that has been moved $E_x$ in the x direction and $E_y$ in the y direction from $P_{I-1}(x,y)$. Furthermore, this set of movement amount values $(E_x, E_y)$ is expressed eight ways as follows using the blur amount w such that they correspond to the eight blur directions θ.

When θ=0°, (Ex, Ey)=(w,0)
When θ=45°, (Ex, Ey)=(w,w)
When θ=90°, (Ex, Ey)=(0,w)
When θ=135°, (Ex, Ey)=(−w,w)
When θ=180°, (Ex, Ey)=(−w,0)
When θ=225°, (Ex, Ey)=(−w,−w)
When θ=270°, (Ex, Ey)=(0,−)
When θ=315°, (Ex, Ey)=(w,−w)

Next, the image processing unit 41 calculates the eight point spread functions $H_I(x,y)$ by blurring portions where the values of the eight functions $h_I(x,y)$ are 255 using the function h'(x,y) of Equation 1 below. As can be understood from Equation 1, the function h'(x,y) indicates the extent of defocus in the target image. Also, n is the circular constant.

$$h'(x,y)=(1/2\pi\sigma^2)\exp\{-(x^2+y^2)/2\sigma^2\} \quad \text{(Equation 1)}$$

As described above, the eight point spread functions $H_I(x,y)$ are derived with respect to the eight blur directions θ. That is to say that although the actual blur direction θ is unknown, here, eight candidate values are given in advance as the value of θ. In step S3 thereafter, eight intermediate images $f_I(x,y)$ are generated from the reference image $g_I$ as images in which blurring improvement has been attempted in the eight blur directions θ, namely θ=0°, 45°, 90°, 135°, 180°, 225°, 270°, and 315°.

Specifically, for each point spread function $H_I$, the generation unit 41a generates the intermediate image $f_I(x,y)$ by subjecting the target image to Fourier transformation, subjecting the resulting image to an inverse filter, which is the inverse of the function obtained by subjecting the point spread function $H_I(x,y)$ to Fourier transformation, and then subjecting the image resulting from the application of the inverse filter to inverse Fourier transformation. At this time, the parameters for the correction method, the noise coefficient, and the calculation repetition limit are referenced as appropriate.

In step S4 following step S3, the display control unit 42 causes the blur correction screen W3 (see FIG. 6) to be displayed in an overlaid manner on the basic screen W1. An image group display area C1 is provided on the blur correction screen W3, and the reference image $g_I(x,y)$ and eight intermediate images $f_I(x,y)$ are displayed in the area C1. More specifically, the reference image $g_I(x,y)$ is arranged in the center of the image group display area C1, and the eight intermediate images $f_I(x,y)$ are arranged on the periphery of the reference image $g_I(x,y)$ in directions that match the respective blur directions $\theta=0°$, 45°, 90°, 135°, 180°, 225°, 270°, and 315°.

Then, the operation reception unit 43 receives, from the user, the selection of a specific image out of the eight intermediate images $f_I(x,y)$ in the image group display area C1. Accordingly, while visually checking the effect of the blur correction routine, the user can select an image in which blurriness has actually been reduced in comparison with the reference image $g_I(x,y)$ as the corrected image for the reference image $g_I(x,y)$ out of the eight presented intermediate images $f_I(x,y)$. This selection means that the actual blur direction is selected out of the multiple blur directions, namely $\theta=0°$, 45°, 90°, 135°, 180°, 225°, 270°, and 315°. Note that in the present embodiment, the operation for selecting the corrected image is performed by temporarily selecting a specific intermediate image $f_I(x,y)$ by single-clicking, and subsequently pressing a "move" button B1, but it is possible to change to another mode such as double-clicking the specific intermediate image $f_I(x,y)$ as appropriate.

In step S5 following step S4, the operation reception unit 43 determines whether or not the user has selected a corrected image out of the eight intermediate images $f_I(x,y)$ in the image group display area C1. Here, if it is determined that a corrected image has been selected, the procedure returns to the processing of step S3, the corrected image is used as the new reference image $g_{I+1}(x,y)$, and the next iteration (I+1) of the blur correction routine is executed. That is to say, one of the eight intermediate images $f_I(x,y)$ that were generated from the reference image $g_I(x,y)$ by performing blur correction in eight blur directions $\theta$ in the I-th iteration of step S3 is the reference image $g_{I+1}(x,y)$ in the (I+1)-th iteration of step S3. On the other hand, in step S5, if it is determined that a corrected image has not been selected, the procedure moves to the processing of step S6.

In step S6, the operation reception unit 43 determines whether or not the user has instructed a change in the parameters of the blur correction routine via the areas C2 to C6 (see FIGS. 6 and 7) on the blur correction screen W3. Here, the area C2 receives settings for the correction method from the user, the area C3 receives settings for the noise coefficient, the area C4 receives settings for the standard deviation $\sigma$, the area C5 receives settings for the blur amount w, and the area C6 receives settings for the calculation repetition limit. Note that the blur amount w is in units of pixels.

Then, if it is determined in step S6 that a parameter change has been instructed, the procedure returns to the processing of step S2, and as described above, the parameters for the blur correction routine are updated. Then, in step S3 thereafter, the blur correction routine is executed on the target image using the changed parameters so as to perform blur correction again on the same reference image $g_I(x,y)$ as the previous time in the eight blur directions $\theta$, and eight intermediate images $f_I(x,y)$ are newly generated. Furthermore, in step S4 thereafter, the eight intermediate images $f_I(x,y)$ in the image group display area C1 are updated. On the other hand, in step S6, if it is determined that a parameter change has not been instructed, the procedure moves to the processing of step S7.

In this way, in step S3, the blur correction routine is executed again not only in the case where the user selects a corrected image on the blur correction screen W3, but also in the case where the blur correction routine parameters have been changed. However, as shown in FIG. 5, the iteration number I of step S3 is incremented by one only in the case where the user selects a corrected image on the blur correction screen W3.

Next, in step S7, the operation reception unit 43 determines whether or not the user has pressed a "return to previous" button B2 on the blur correction screen W3. The button B2 is a button that is to be pressed when, for example, the user decides upon second thought that the intermediate image $f_I(x,y)$ that was selected on the blur correction screen W3 is not appropriate as the corrected image, and when the button B2 is pressed, the effects of the processing obtained by the immediately previous blur correction routine are canceled. Specifically, if it is determined in step S7 that the button B2 has been pressed, the iteration number I of step S3 is decremented by one and subsequently, the procedure returns to the processing of step S4. Then, in step S4 following step S7, the image group display area C1 is returned to the state it was in immediately after the blur correction routine was executed in the iteration of step S3 prior by one to the iteration during which the button B2 was pressed (if the previous iteration of step S3 has been executed multiple times, the state it was in immediately after the most recent one was executed). Note that in the case where I<2, the button B2 cannot be pressed and is displayed in grayout. Accordingly, if I<2, "Yes" is not valid in step S7, and the procedure moves to the processing of step S8. Also, in step S7, if it is determined that the button B2 was not pressed, the procedure moves to the processing of step S8 as well.

Next, in step S8, the operation reception unit 43 determines whether or not the user has pressed an "OK" button B3 or a "cancel" button B4 on the blur correction screen W3. Here, if it is determined that the "cancel" button B4 has been pressed, all effects of the processing up to that point in time are canceled. Specifically, the blur correction screen W3 is closed, all of the intermediate images $f_I(x,y)$ that were generated up to that point are discarded from the RAM, and the processing ends without the order m of the selected frame group progressing. On the other hand, in step S8, if it is determined that the "OK" button B3 has been pressed, the procedure moves to the processing of step S9. The "OK" button B3 is a button that is to be pressed in the case where the user has found an appropriate final corrected image for the target image, in the case where no more blurring can be removed, or the like. Also, in step S8, if it is determined that neither of the buttons B3 and B4 have been pressed, the procedure returns to the processing of step S5.

In step S9, the saving unit 41b stores the final corrected image for the target image in the processed file area 52 as the next m-th order still image of the frame currently being processed, or in other words, as the final generated object of the present processing. Here, the final corrected image is in principle the reference image $g_I(x,y)$ that is arranged in the center of the area C1 at the time when the "OK" button B3 is pressed, but if any one of the intermediate images $f_I(x,y)$ in the area C1 has been temporarily selected at that time, that intermediate image will be the final corrected image. Also, as is evident from the description above, excluding the case where the iteration number I is decremented in step S7 and thereafter the operation for selecting the corrected image is not performed, the image $g_I(x,y)$ that is arranged in the center of the area C1 at the time when the "OK" button B3 is pressed is the corrected image that was most recently selected.

Note that depending on conditions such as the value of I, sometimes the final corrected image is the same as the target image. However, in such a case, although it is not shown in FIG. 5, step S9 and step S10 that follow thereafter are skipped, the blur correction screen W3 is closed, and the processing in FIG. 5 is ended.

Also, in step S9, the final corrected image is stored in the processed file area 52 along with the history of the parameters and the blur directions θ for the blur correction routine that are needed in order to obtain the final corrected image from the target image in the shortest route. Note that the "shortest route" mentioned here means that the parameters and blur directions θ for the blur correction routine whose effects were canceled due to the "return to previous" button B2 being pressed are disregarded. In other words, in the case where a complex bent path is rendered when the vectors of the blur directions θ from the target image to the final corrected image are added together, this does not mean that the origin and endpoint of the path are connected in a straight line. On the other hand, if reference images $g_2(x,y)$ to $g_{I-1}(x,y)$ are present, those images and all other of the intermediate images generated up to that time are discarded from the RAM, without being stored anywhere in the storage unit 30. This is because these images are not useful thereafter, and can be regenerated by referencing the blur correction routine parameters and the history of the blur directions θ.

Next, in step S10 following step S9, the remaining frames that are included in the selected frame group but were not selected in step S1 are processed similarly to the frame that was selected in step S1. More specifically, the generation unit 41a subjects the remaining frames to the blur correction routine having the same number of iterations as that needed to obtain the final corrected image from the target image in the shortest route, in the same blur direction θ using the same parameters. Also, out of the images that are generated in this process, the saving unit 41b stores only the finally-generated corrected image, excluding the intermediate images, in the processed file area 52. When step S10 ends, the blur correction screen W3 is closed and the processing in FIG. 5 ends. Note that it is particularly useful to execute a similar blur correction routine on all frames included in the selected frame group in the case where the blurring is caused by a subject moving in a certain direction.

As described above, according to this processing, an appropriate corrected image is successively selected by the user from among multiple candidate images $f_I(x,y)$ that are successively generated with respect to the target image as the iteration number I of the blur correction routine in step S3 advances. As a result, it is possible to obtain a corrected image from which not only blurring that appears in a linear path has been removed, but also complex blurring such as blurring that appears in a bent path has been removed. Also, in this processing, it is possible for the user not only to advance the iteration number I, but also to return it to a prior value. Accordingly, while successively selecting corrected images that seem appropriate upon viewing, the user can cancel a selection that, upon second thought, is not appropriate, and, after attempting blur corrections according to various blur routes, the user can select the most appropriate corrected image out of the corrected images. Thus, the user can find the most appropriate corrected image by going forward and backward on the blur correction screen W3.

Figure 6:
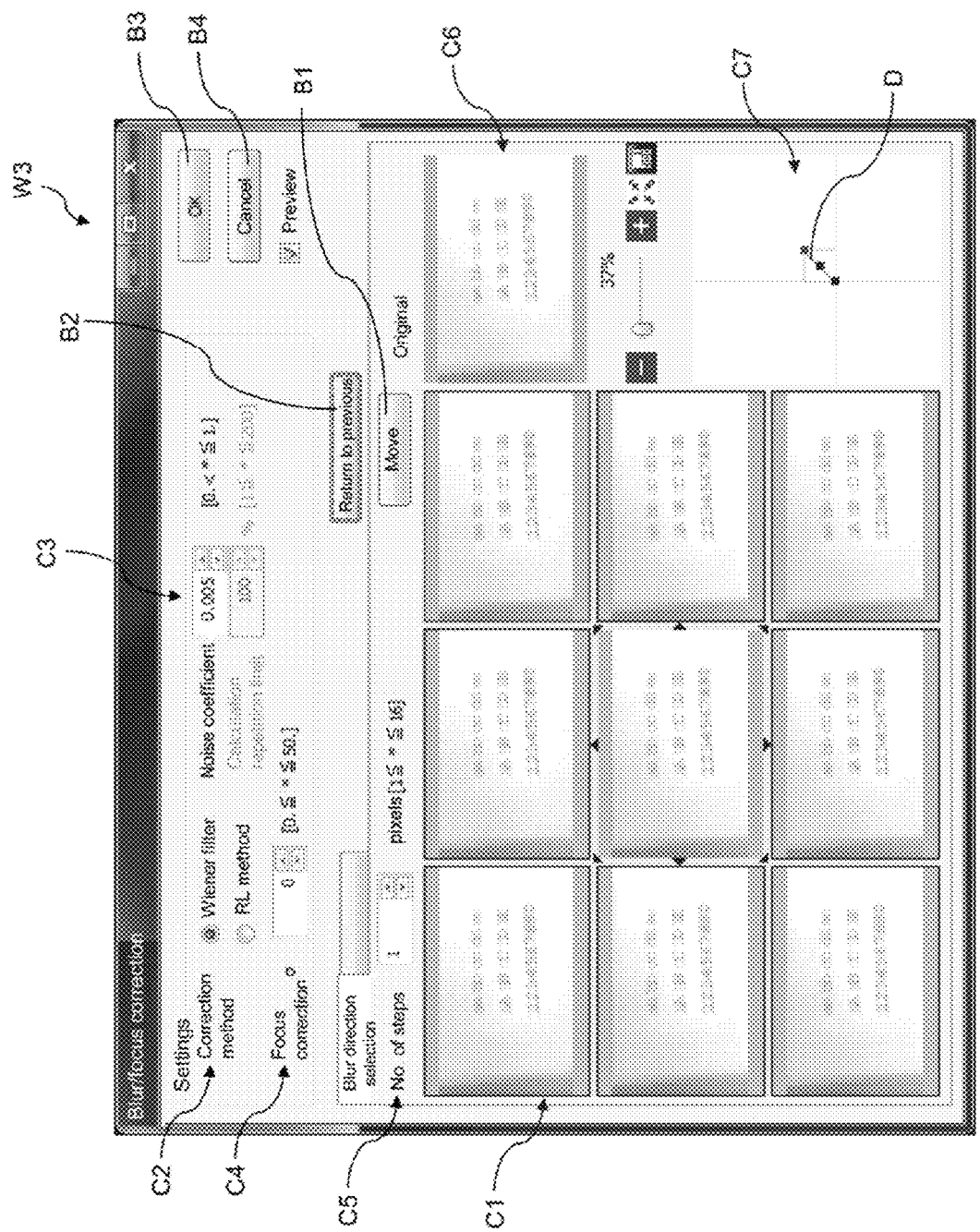
FIG. 6 is a diagram showing a blur correction screen.
Figure 7:
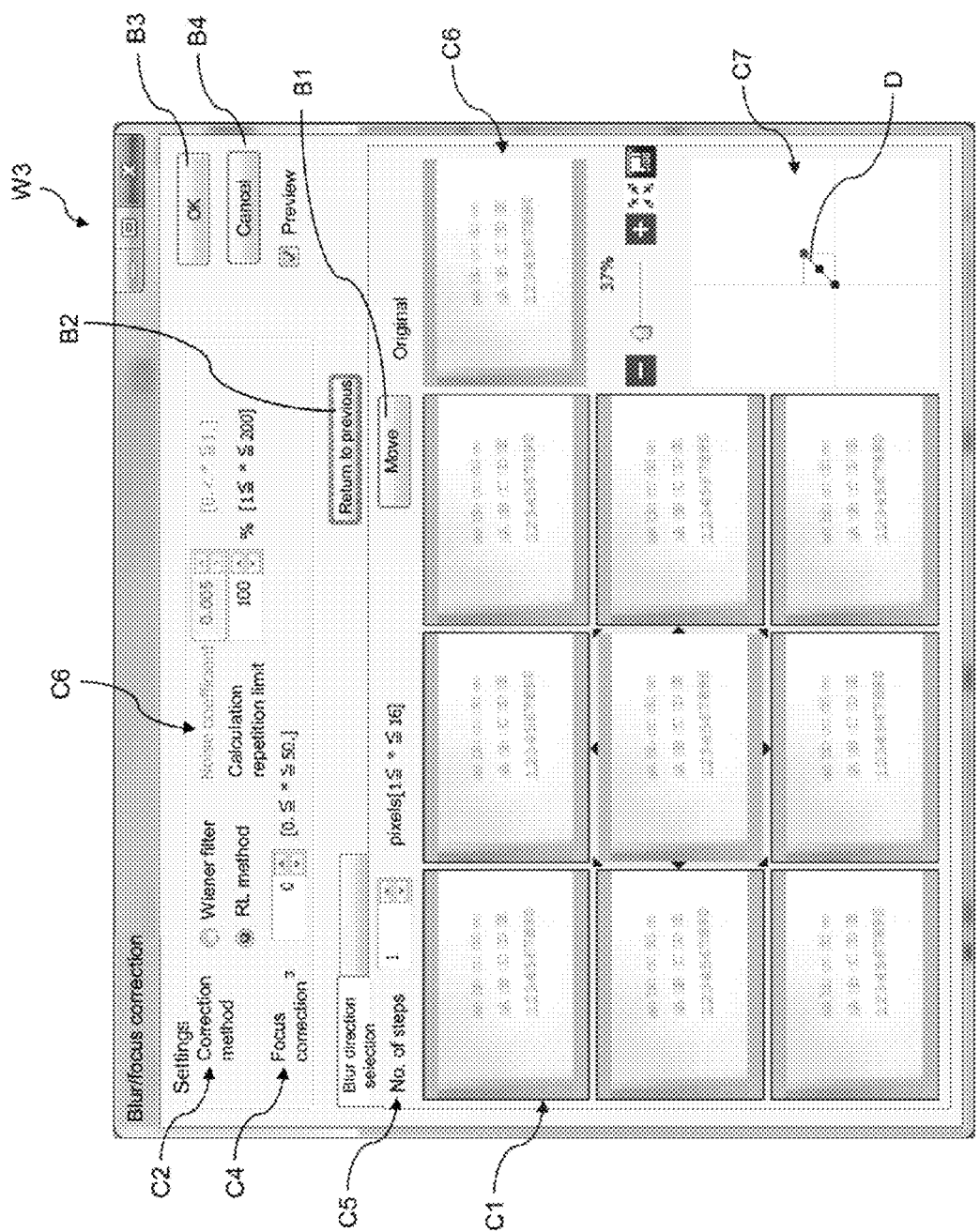
FIG. 7 is another diagram showing a blur correction screen.

Incidentally, as shown in FIG. 6, the initial image display area C6 for always displaying the target image regardless of the iteration number I of the blur correction routine in step S3 is provided on the blur correction screen W3. Accordingly, the user can select the next corrected image, determine the timing of the end of the processing, and the like while always performing a comparison with the target image, regardless of the iteration number I.

Figure 8:
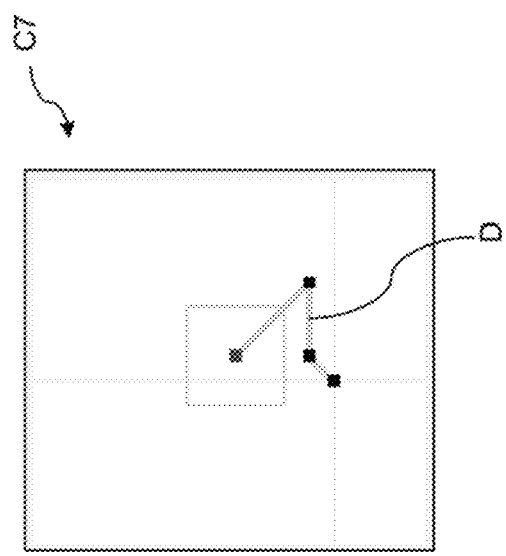
FIG. 8 is a diagram showing a line diagram in a blur direction display area.

Also, as shown in FIG. 6, the blur correction screen W3 includes a blur correction display area C7 for displaying a line diagram D showing the shortest blur direction from the target image to the image that is currently selected in the area C1. Here, the image that is currently selected in the area C1 is in principle the reference image $g_I(x,y)$ that is currently arranged in the center of the area C1, but if one of the intermediate images $f_I(x,y)$ in the area C1 is currently temporarily selected, that intermediate image will be the image that is currently selected in the area C1. The line diagram D is rendered in a bent line mode such that the direction in which the line extends indicates the blur direction θ, and the length of the line indicates the blur amount w. For example, regarding the parameters selected as the iteration number I advances from 1 to 4, if θ is 45°, 0°, and then 135°, and the blur amount w is 1 pixel, 3 pixels, and then 2 pixels in that order, the line diagram D will be as shown in FIG. 8. Note that the line diagram D in the area C7 changes in real time every time the iteration number I changes or an intermediate image $f_I(x,y)$ in the area C1 is temporarily selected. Accordingly, at any time, the user can intuitively understand the blur direction from the reference image $g_I(x,y)$ to the most recent corrected image or to the corrected image that the user is attempting to select.

3. Application

The image processing program 2 can handle image processing with respect to various types of video, and for example, it can be used in the field of analyzing surveillance video from a security camera in order for an organization such as the police to investigate an incident. For example, there are cases where the license plate number of a suspect's car is captured on the surveillance video of the security camera. However, since this type of subject is moving, there are many cases where it is blurry in the surveillance video and it is not captured clearly. However, the blur correction function of the image processing program 2 makes it possible to read the license plate number of this suspect's car.

4. Features

In the above-described embodiment, the blur direction θ from the reference image $g_I(x,y)$ is not automatically estimated based on the reference image $g_I(x,y)$, but rather, multiple candidate values for the blur direction θ are defined in advance. In other words, rather than first determining the blur direction θ and then executing blur correction in that blur direction θ, blur correction is performed in multiple candidate blur directions θ before the blur direction θ is determined. Then, while visually checking the effect of the blur correction, the user selects the correct corrected image, or in other words, the correct blur direction from among the multiple candidate images, or in other words, the multiple candidate blur directions θ that are obtained as a result. Accordingly, blurring can be accurately removed by the user determining the blur direction while visually checking the effect of the blur correction. Also, the calculation load can be reduced compared to the case where a computer estimates the blur direction based on a reference image $g_f(x,y)$ in which blurring appears.

5. Variations

Although an embodiment of the present invention has been described above, the present invention is not limited to the above-described embodiment, and various modifications are possible within a scope that does not deviate from the gist of the invention. For example, the following modifications are possible.

5-1

In the above embodiment, the user cannot change the blur direction θ, but it is possible to allow the user to change the blur direction θ similarly to parameters such as the blur amount w. To implement this modification, it is possible to display an area, like the areas C2 to C5, for receiving a change in the blur direction θ on the blur correction screen W3. According to this variation, for example, in the case where a user, upon viewing intermediate images that have undergone blur correction where θ=0° and 45°, determines that the actual blur direction θ is around 30°, it is possible to obtain a more appropriate corrected image where θ=30°. Also, instead of or in addition to that, it is possible to not allow the user to change at least one of the correction method, the noise coefficient, the standard deviation σ and the blur amount w.

5-2

Instead of the initial values of parameters such as the standard deviation σ and the blur amount w being defined in advance and subsequently changed manually by the user, those parameters may be calculated automatically based on the target image in accordance with an appropriate algorithm. Note that since there are a variety of publicly-known algorithms of this type, they will not be described here.

5-3

The algorithm for the blur correction routine can be changed in various ways, and for example, the model of the point spread function $H_f(x,y)$ can also be changed as appropriate. For example, it is possible to use $H_f(x,y)=h_f(x,y)$ without giving consideration to σ, which is the parameter indicating the extent of defocus in the target image.

5-4

In the above embodiment, the candidate values for the blur direction θ were set in advance as θ=0°, 45°, 90°, 135°, 180°, 225°, 270°, and 315°, but it is possible to allow the user to set them as appropriate. As the mode of setting, for example, a mode of allowing the user to manually change the candidate values is conceivable, and a mode is also conceivable in which, after the number of candidate values has been manually set by the user, the image processing apparatus 1 automatically divides a whole perimeter of 360° into equal parts according to the number of candidate values.

5-5

It is possible to execute step S3 (blur correction routine) multiple times in the embodiment above, but it is also possible to execute step S3 only one time. In other words, the procedure may move immediately to step S8 when a corrected image is selected once with respect to the target image (Yes in step S5). In that case, the processing in FIG. 5 needs to be changed accordingly, and for example, step S7 is skipped, and thus in the case of "No" in step S6, the procedure moves to step S8.

The invention claimed is:

1. An image processing apparatus configured to be connected to a display device and remove blurring from a first-order image, the image processing apparatus comprising:
   a generation unit of a CPU configured to generate a plurality of I-th order intermediate images by performing blur correction on an I-th order image in a plurality of blur directions;
   a display control unit of the CPU configured to cause the plurality of I-th order intermediate images to be displayed on the display device; and
   a selection reception unit of the CPU configured to allow a user to select an (I+1)-th order image from among the displayed plurality of I-th order intermediate images as a corrected image in which blurring has been reduced to a greater degree than in the I-th order image,
   wherein the generation unit, the display control unit, and the selection reception unit are configured to perform the operations in order with respect to I=1, 2, . . . , K (K being a natural number).

2. The image processing apparatus according to claim 1, wherein K is a natural number that is greater than or equal to 2.

3. The image processing apparatus according to claim 1, further comprising:
   a storage unit configured to store a (K+1)-th order image as a final corrected image obtained by removing blurring from the first-order image.

4. The image processing apparatus according to claim 2, further comprising:
   a storage unit configured not to store second-order to K-th order images, and configured to store a (K+1)-th order image as a final corrected image obtained by removing blurring from the first-order image.

5. The image processing apparatus according to claim 1, wherein the display control unit is configured to cause the plurality of I-th order intermediate images to be displayed on the display device using a mode of arranging the plurality of I-th order intermediate images in directions corresponding to the respective blur directions using the I-th order image as a reference.

6. The image processing apparatus according to claim 2, wherein the display control unit is configured to cause the blur direction from the first-order image to the (I+1)-th order image to be displayed as a line diagram, in order with respect to I=1, 2, . . . , K.

7. The image processing apparatus according to claim 1, wherein the selection reception unit is configured to allow the user to select a blur amount that is to be a blur correction parameter.

8. The image processing apparatus according to claim 2, further comprising:
   a storage unit configured to store a (K+1)-th order image as a final corrected image obtained by removing blurring from the first-order image.

9. The image processing apparatus according to claim 2, wherein the display control unit is configured to cause the plurality of I-th order intermediate images to be displayed on the display device using a mode of arranging the plurality of I-th order intermediate images in directions corresponding to the respective blur directions using the I-th order image as a reference.

10. The image processing apparatus according to claim 3, wherein the display control unit is configured to cause the plurality of I-th order intermediate images to be displayed on the display device using a mode of arranging the plurality of I-th order intermediate images in directions corresponding to the respective blur directions using the I-th order image as a reference.

11. The image processing apparatus according to claim 4, wherein the display control unit is configured to cause the plurality of I-th order intermediate images to be displayed on the display device using a mode of arranging the plurality of I-th order intermediate images in directions corresponding to the respective blur directions using the I-th order image as a reference.

12. The image processing apparatus according to claim 8, wherein the display control unit is configured to cause the plurality of I-th order intermediate images to be displayed on the display device using a mode of arranging the plurality of I-th order intermediate images in directions corresponding to the respective blur directions using the I-th order image as a reference.

13. The image processing apparatus according to claim 4, wherein the display control unit is configured to cause the blur direction from the first-order image to the (I+1)-th order image to be displayed as a line diagram, in order with respect to I=1, 2, . . . , K.

14. The image processing apparatus according to claim 2, wherein the selection reception unit is configured to allow the user to select a blur amount that is to be a blur correction parameter.

15. The image processing apparatus according to claim 3, wherein the selection reception unit is configured to allow the user to select a blur amount that is to be a blur correction parameter.

16. The image processing apparatus according to claim 4, wherein the selection reception unit is configured to allow the user to select a blur amount that is to be a blur correction parameter.

17. A non-transitory computer-readable medium storing an image processing program for removing blurring from a first-order image, the program causing a computer to execute steps of:

generating a plurality of I-th order intermediate images by performing blur correction on an I-th order image in a plurality of blur directions;

displaying the plurality of I-th order intermediate images; and allowing a user to select an (I+1)-th order image from among the displayed plurality of I-th order intermediate images as a corrected image whose blurring has been reduced to a greater degree than in the I-th order image, wherein the generating, displaying and allowing are performed in order with respect to I=1, 2, . . . , K (K being a natural number).

18. The non-transitory computer-readable medium according to claim 17, wherein K is a natural number that is greater than or equal to 2.

19. An image processing method for removing blurring from a first-order image, comprising steps of:

generating by using a computer, a plurality of I-th order intermediate images by performing blur correction on an I-th order image in a plurality of blur directions;

displaying by using the computer, the plurality of I-th order intermediate images; and allowing by using the computer, a user to select an (I+1)-th order image from among the displayed plurality of I-th order intermediate images as a corrected image in which blurring has been reduced to a greater degree than in the I-th order image, wherein the generating, displaying and allowing are performed in order with respect to I=1, 2, . . . , K (K being a natural number).

20. The image processing method according to claim 19, wherein K is a natural number that is greater than or equal to 2.

* * * * *